Dec. 13, 1966  T. J. SMITH ETAL  3,291,173
SHUFFLE FEED END TRIMMER FOR VEGETABLES
Filed Jan. 22, 1965  6 Sheets-Sheet 1

FIG_1

FIG_2

INVENTORS
TRAVER J. SMITH
RALPH K. DAUGHERTY
BY Allen and Chromy
ATTORNEYS

Dec. 13, 1966  T. J. SMITH ETAL  3,291,173
SHUFFLE FEED END TRIMMER FOR VEGETABLES
Filed Jan. 22, 1965  6 Sheets-Sheet 2

INVENTORS
TRAVER J. SMITH
RALPH K. DAUGHERTY
BY Allen and Chromy
ATTORNEYS Dec. 13, 1966  T. J. SMITH ETAL  3,291,173
SHUFFLE FEED END TRIMMER FOR VEGETABLES
Filed Jan. 22, 1965  6 Sheets-Sheet 6

INVENTORS
TRAVER J. SMITH
RALPH K. DAUGHERTY
BY Allen and Chromy
ATTORNEYS

United States Patent Office 3,291,173
Patented Dec. 13, 1966

3,291,173
SHUFFLE FEED END TRIMMER FOR VEGETABLES
Traver J. Smith and Ralph K. Daugherty, San Jose, Calif., assignors of one-half to Genevieve I. Magnuson and one-half to Genevieve I. Magnuson, Robert Magnuson and Lois J. Fox, as trustees of the estate of Roy M. Magnuson
Filed Jan. 22, 1965, Ser. No. 427,374
20 Claims. (Cl. 146—81)

The present application is a continuation-in-part of our copending application Serial No. 220,175, filed August 29, 1962, now abandoned for Shuffle Feed End Trimmer for Vegetables.

The present invention relates to apparatus for cutting vegetables in two or more pieces and for trimming the ends of vegetable articles such as pickles, cucumbers, corn and the like, and is concerned more particularly with the provision of a shuffle feed mechanism incorporating end trimming means for trimming the ends of vegetable articles as an incident to the feeding thereof.

It is a general object of the invention to provide vegetable halving or end trimming means as a part of a shuffle feed mechanism.

Another general object of the invention is to provide cutting or end trimming means which operate as a function of the feeding of the article in progressing along a path.

A further object of the invention is to provide end trimming means where the vegetables are trimmed to a fixed length.

Still another object of the invention is to provide end trimming means where the vegetable is trimmed a fixed distance from each end thereof.

The above and other objects of the invention are attained as described in the accompanying specification, taken in conjunction with the attached drawings, in which:

FIG. 1 is a schematic plan view of apparatus embodying the invention;

FIG. 2 is a schematic side elevational view of the apparatus;

FIGS. 13 through 16 illustrate a modified preferred form of the invention;

FIGS. 17, 18 and 19 illustrate a third modification of the invention showing the invention as applied to a potato halver;

Referring to FIGS. 1 and 2, the apparatus of the present invention includes a first shuffle feed structure 10, and a second shuffle feed structure 11 which are arranged in tandem fashion, the shuffle feed structure 10 being arranged to discharge onto the shuffle feed structure 11. Both of these shuffle feed structures are generally of the type described in the patent to Magnuson et al., No. 2,792,929, May 21, 1957, to which reference is made for details of structure not shown herein.

Generally, the shuffle feed structure 11 (FIGS. 1, 2 and 3) comprises similar movable sets of shuffle members 13 and 14 which are generally rectangular in their construction and are mounted in inclined position having a long upwardly facing article supporting portion and a short upwardly facing article feeding and supporting portion. These two portions are generally disposed at an angle of 90 degrees to each other. The set of shuffle feed members 14 extend between and are secured to opposite frame members 16 in the form of side plates which confine the articles within the transverse dimension of the shuffle feed. These opposite upper members 14 are supported from the frame 15 by four parallel links 17. The other shuffle feed members 13 are carried by upwardly projecting angles from a lower pair of opposite frame members or plates 19 which are supported by four parallel links 21. The means for driving or reciprocating the sets of shuffle feed members in opposite directions comprises a variable speed motor 31 mounted on a frame plate 32, and driving through suitable chain and sprocket means a transverse shaft 33 suitably journaled on the frame and carrying respective pairs of eccentrics 34 whose eccentric followers are connected by the links 35 with the upper set of shuffle members 14 and the lower set of shuffle members 13, respectively. These shuffle members move in opposite directions simultaneously to effect the feeding movement.

The shuffle feed 10 is similar to that described in connection with the shuffle feed 11 but certain details have been omitted from the drawings as unnecessary to an understanding of the present invention.

The above described structure is all contained in said Patent No. 2,792,929.

Figure 3:
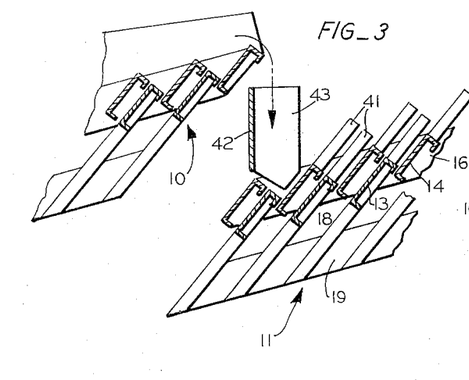
FIG. 3 is a schematic sectional view illustrating the transfer of articles from one shuffle feed mechanism to a second shuffle feed mechanism.
Figures 9, 10, 11:
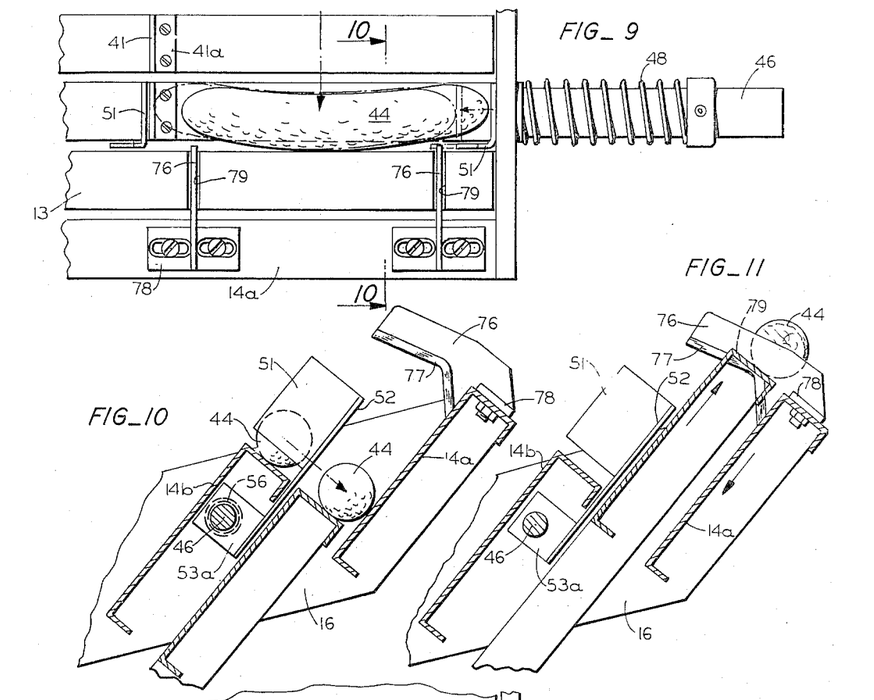
FIG. 9 is a fragmentary enlarged plan view showing the article adjacent the point of trimming its ends.
FIG. 10 is a fragmentary sectional elevation taken as indicated by the line 10—10 in FIG. 9.
FIG. 11 is a view similar to FIG. 10 showing the parts in a different phase of the operation.

Shuffle feed mechanisms of the character described herein of the conventional type, such as the shuffle feed mechanism 10, serve to receive an indiscriminate array or body of elongated articles such as pickles, and as they are fed from shuffle member to shuffle member, serve to land these articles end to end and to distribute them across the width of the shuffle feed. The shuffle feed members of the second shuffle feed 11, as illustrated in FIGS. 1, 3 and 9, has the shuffle feed divided into longitudinally extending paths by a plurality of series of division members in the form of angles 41. Each angle 41 has its short flange 41a secured to the end or outside advancing surface of the shuffle feed member, and has its long flange projecting outwardly in parallel relation with the path of movement of the shuffle feed member so as to form effectively a partition strip dividing the shuffle feed into separate channels of flow according to the length of the article being fed.

Figure 4:
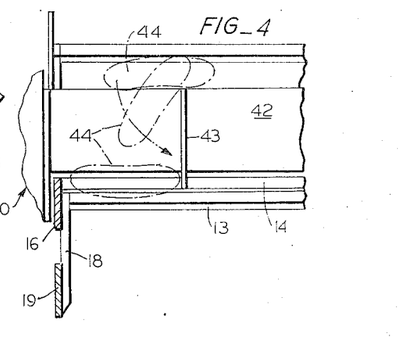
FIG. 4 is a schematic elevational view of the apparatus shown in FIG. 3.

A special transfer means is provided between the shuffle feed 10 and the shuffle feed 11 to insure feeding of the elongated articles such as pickles into the proper channel of the shuffle feed member 11. For this purpose a transfer member is provided in the form of a transversely extending plate 42 (FIGS. 1, 3 and 4) secured at its ends to the frame 10 and positioned vertically, as seen in FIG. 3, between the discharge end of the shuffle feed 10 and the feed end of the shuffle feed 11. This plate 42 has a series of dividers or plates 43 projecting outwardly therefrom in spaced relation corresponding to the spacing of the angles 41 on the shuffle feed 11 and in longitudinal alignment with the partition members or angles 41. As seen in FIG. 4, an article 44 falling so as to strike a partition plate 43 will be caused to fall to one or the other side of the plate so as to be in the proper channelized relation on the shuffle feed 11.

Elongated articles such as pickles are fed from shuffle feed member to shuffle feed member of the shuffle feed 11 between the partition angles or members 41, and eventually will arrive one by one at the discharge end of this shuffle feed in position for an end trimming operation. At this point means is brought into play to move the elongated member or pickle to one side of the channel in which it is placed, and then to carry the elongated member or pickle past a trimming knife or knives carried by one of the shuffle feed members, as will now be described.

Referring to FIGS. 5 through 9, the next to the last shuffle feed member 14b of the set of shuffle feed members 14 and its associated side frame members 16 slidably carry a transverse shaft 46 by means of respective end bushings 47 secured to the respective side frame members 16. This shaft 46 is urged by a spring 48 toward the left of the views shown in FIGS. 6 and 7, toward the right in FIG. 9, and this shaft 46 carries a series of yieldably mounted pusher plates 51, one for each path or channel on the shuffle feed 11. Each pusher plate 51 (FIGS. 6 and 7) is carried at the end of an arm 52 projecting from a channel-shaped bail 53 having its end flanges 53a apertured and slidably received on the shaft 46. Between the end flanges 53a there is positioned a stop collar 54 pinned to the shaft 46 and a compression spring 56 disposed between the collar 54 and the right-most end flange 53a of the bail 53. As a result, when the shaft 46 is moved from the position shown in FIG. 7 to the right, to the position shown in FIG. 6, a thrust is transmitted from the shaft 46 through each collar 54 and each spring 56 to each pusher plate 51. As seen in FIG. 10, each pusher plate 51 is in an outwardly projecting position from the shuffle feed member 14b so that a pickle being progressed upwardly by this shuffle feed member 14b over an adjacent shuffle feed member 13 would also be progressed to the right as viewed in FIG. 6, or to the left as viewed in FIG. 9, until the opposite end of the elongated member engages the particular partition angle or path defiening means 41 of this shuffle feed member. The yielding action of the spring 56 enables handling of a range of lengths of elongated articles such as pickles on a given shuffle feed mechanism.

Figures 5, 8:
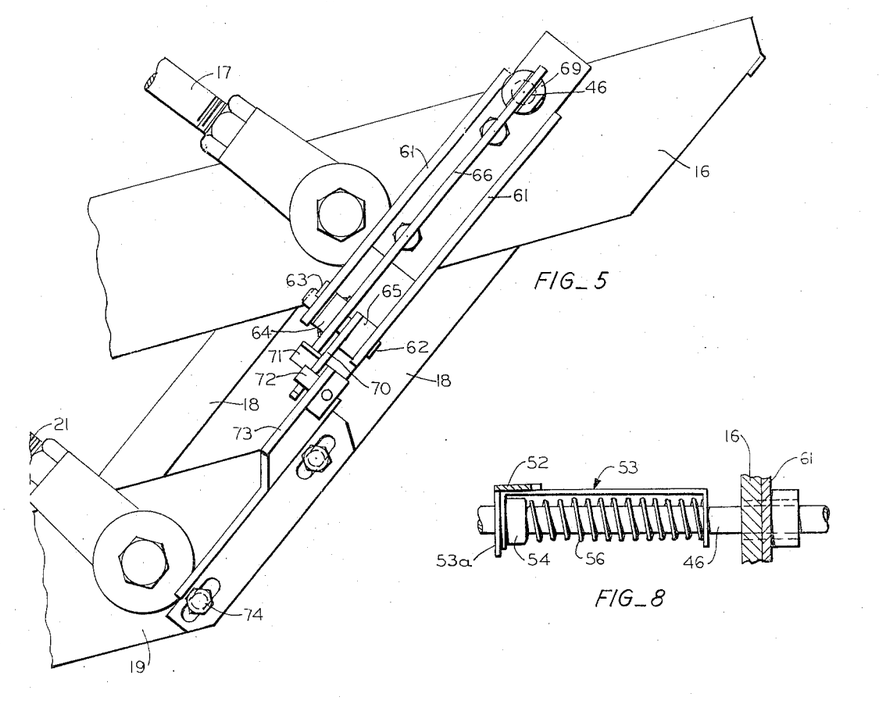
FIG. 5 is a fragmentary enlarged elevational view of a portion of FIG. 2.
FIG. 8 is a fragmentary sectional elevation taken in the plane indicated by the line 8—8 in FIG. 6.

The means for operating the shaft 46 from the action of the shuffle feed mechanism comprises a control exercised by the two sets of shuffle feed members 13 and 14 during their movement, and this linkage control includes a channel-shaped pivot bracket 61 (FIGS. 6 and 7) carrying a pivot pin 62 therein which is locked in place by a retainer 63 pivoted on the bracket 61. The two arms of the bracket 61, between which the pivot pin 62 extends, embrace the hub 64 of an upwardly projecting arm 66 having a pivotal slotted connection at 67 with a pin 68 carried by a fork 69 secured on the end of the shaft 46. The pivot pin 62 also carries the hub 65 of a lower substantially horizontal arm 70, having a one-way drive connection with the upper arm 69 by means of a stop lug 71. The end of the lower arm 70 of this bell crank mechanism is adapted to engage beneath a control lug 72 carried by a bracket 73 adjustably mounted on the lower side frame member 19 of the lower shuffle feed mechanism by means of a bolt and slot connection 74 (FIG. 5).

Figure 6:
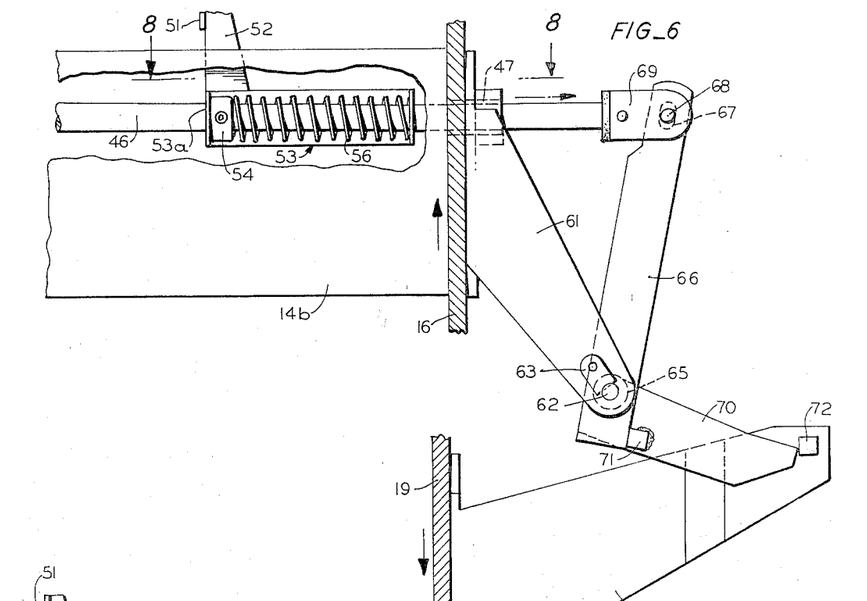
FIG. 6 is a schematic plan view, partly in section, of the apparatus shown in FIG. 5.
Figure 7:
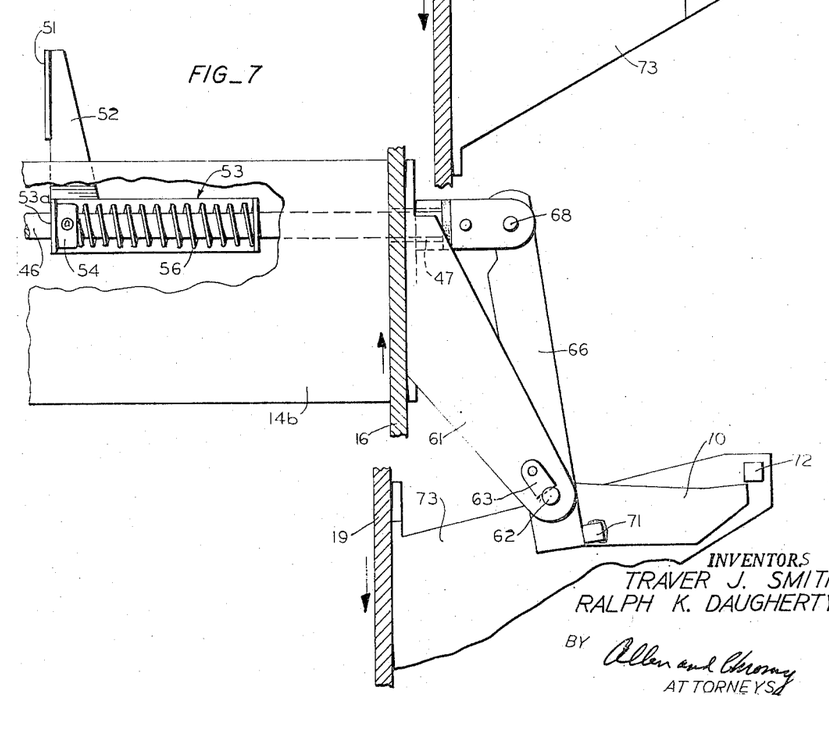
FIG. 7 is a view similar to FIG. 6 but showing the apparatus in a different operating position.

The beginning of the operation is illustrated in FIG. 7 and it is seen that the sets of shuffle feed members 13 and 14 are beginning to separate from each other and to move in the direction indicated by arrows so that the lower arm 70 is rocked by the stop lug 72 and carries the upper arm 66 by means of the lug 71 in a clockwise direction so as to move the shaft 46 in a direction indicated by the arrow in FIG. 6. This moves through the respective springs 56 each of the positioning plates 51 for each of the channels of the shuffle feed mechanism 11 so that the pickles are brought into alignment with respect to one end for cut off purposes.

Referring to FIGS. 9, 10 and 11, the last shuffle feed member 14a of the set 14b has secured thereto a series of pairs of knives 76 carried by respective bracket extensions 78 bolted to the shuffle feed member 14a and having a V-shaped knife edge 77 so disposed as to hold a pickle against the shuffle feed 14a while being cut. As seen in FIG. 9, the cooperating shuffle feed member 13 has a series of slots 79, one for each knife 76, so that as seen in FIG. 11, for example, the shuffle feed carries the elongated member or pickle 44 past the knife 76 so that its end is trimmed a measured distance from one end of the pickle.

As seen in FIG. 9, by virtue of the provision of two knives 76 for each channel in the shuffle feed 11, the pickle is trimmed to a given length determined by the spacing of the knives 76.

Figure 12:
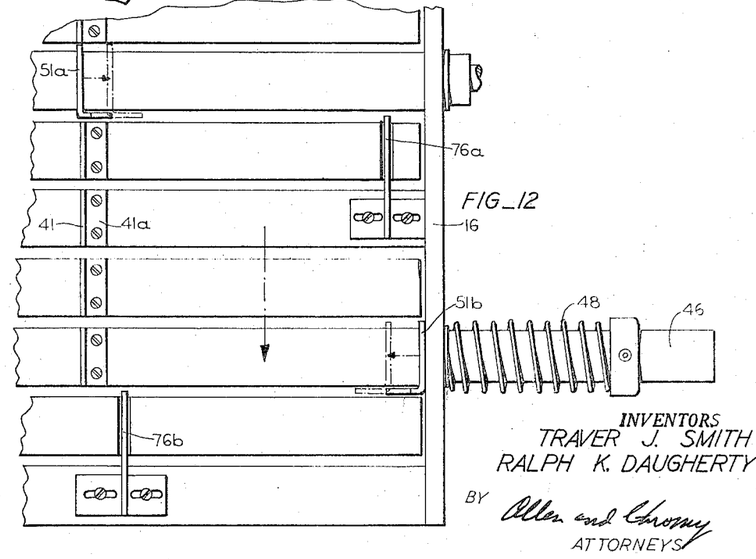
FIG. 12 is a fragmentary plan view illustrating a modified form of the invention wherein the article is trimmed a fixed distance from each end thereof.

Referring to FIG. 12, a modified form of the invention is shown wherein an elongated member or pickle is moved to the right by the positioning plate 51a, and has one end cut off by the knife 76a, and at a subsequent point of its travel along the particular channel, it is positioned toward the left of the channel as viewed in FIG. 12 by the positioning member or plate 51b, and has its other end cut off by the knife 76b. In this embodiment the pickle is trimmed a given amount at each end. It is understood, of course, that the positioning plates 51a and 51b are operated by mechanisms similar to that shown in FIGS. 6 and 7 but one of these mechanisms is operated in an opposite phase so as to move the pickle for positioning in the opposite direction.

As seen in FIGS. 1 and 2, a pair of discharge conveyors 81 and 82 are provided with respective side rails 83. The conveyor 81 is adapted to receive pickle ends directly from the shuffle feed mechanism, as described above, and the conveyor 82 is adapted to receive the trimmed elongated article or pickle by means of the diverting chutes 84 which are aligned with the space between the respective knives 76.

In the description of the modification of FIGS. 13 through 16, similar reference numerals have been used to designate corresponding parts such as reference numerals 10 and 11 for the upper and lower shuffle feeds or sets of shuffle feed members, and the reference numeral 14 for certain of these individual shuffle feed members. Associated with the next to the last shuffle feed member 14b is a pusher plate 101 which is generally similar to the pusher plate 51 heretofore described, and is movably mounted on a transversely extending shaft 102, similar to the shaft 46. This shaft 102 is carried at one end by a link 103 pivoted thereto and at its upper end on a pin 104 carried by an angle-shaped bracket 106 on the side plate 16. The other end of the shaft 102 (FIG. 15) is also pivotally mounted by a link 103a pivoted at its upper end on a pin 104a carried by a bracket 106a. Preferably, each pivotal connection between the shaft 102 and the supporting links 103 and 103a is by means of a yoke member 107, and at each of these connections, a pivot pin 108 (FIG. 16) extends downwardly and rests on a portion of the mounting bracket 106 or 106a, as the case may be.

The means for transverse actuation of the shaft 102, and correspondingly of the pusher plate or member 101 is in the form of a pair of toggle links 111 (FIG. 14) which are pivotally connected intermediate their ends at 108 to the connecting yoke 107 and at 113 on the bracket 106. The pivotal connection 112 of the links 111 is connected by an adjustable link 116 to pivot pin 117 carried by a bracket 118 on the side frame member 19 of the lower shuffle feed.

Figures 13, 14, 15, 16:
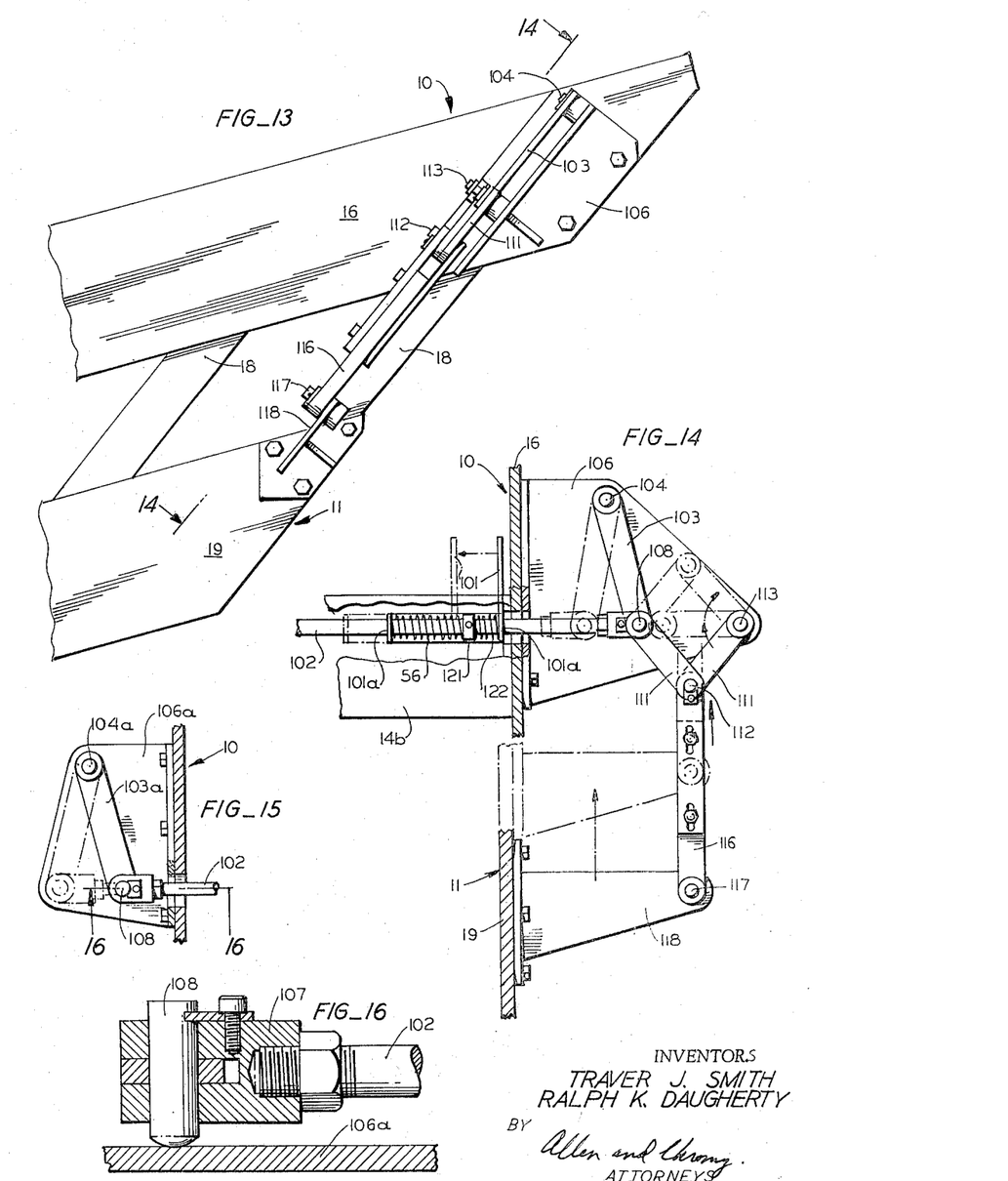
FIG. 13 is a fragmentary enlarged elevational view similar to FIG. 5 of the FIGS. 1 to 12 modification.
FIG. 14 is a schematic plan view, partly in section, similar to the FIG. 6 and taken as indicated by the line 14—14 in FIG. 13.
FIG. 15 is a fragmentary plan view taken at the opposite side of the machine from FIG. 14.
FIG. 16 is a detail sectional view taken in a plane indicated by the line 16—16 in FIG. 15.

Referring to FIG. 14, means is provided for a dwell or delay at the idle end position of the pusher 101 to insure ample time for positioning of a pickle in alignment therewith. For this purpose, the shaft 102 carries a collar 121 having spring 56 and spring 122 interposed between the collar 121 and the respective apertured ears 101a of the supporting portion of the pusher plate 101. As the pusher is moved to the left from the position shown in full line in FIG. 14 to its dotted line position, the spring 56 serves to transmit the motion of the shaft 102 and to adjust the stroke of the pusher plate for different lengths of pickles, the spring 56 yielding when a pickle is encountered before the end of the stroke of the shaft 102. Upon the return of the pusher 101 to the right in FIG. 14, the shaft 102 has an extent of travel which is beyond that permitted by the side wall 16 so that the pusher plate 101 comes to rest before the end of the stroke and remains idle in this position, the spring 122 yielding slightly to accommodate the over travel of the shaft 102 and to provide ample time for an article such as a pickle to be fed in position for the next positioning operation of the pusher plate 101, and subsequent feeding of the article to the cutting or processing station.

It will be noted that because the side plates 16 and 19 and the entire shuffle feed mechanisms 10 and 11 reciprocate toward and away from each other twice for each feeding stroke, there will be one idle movement of the pusher plate 101 between each article positioning movement thereof.

Figure 17:
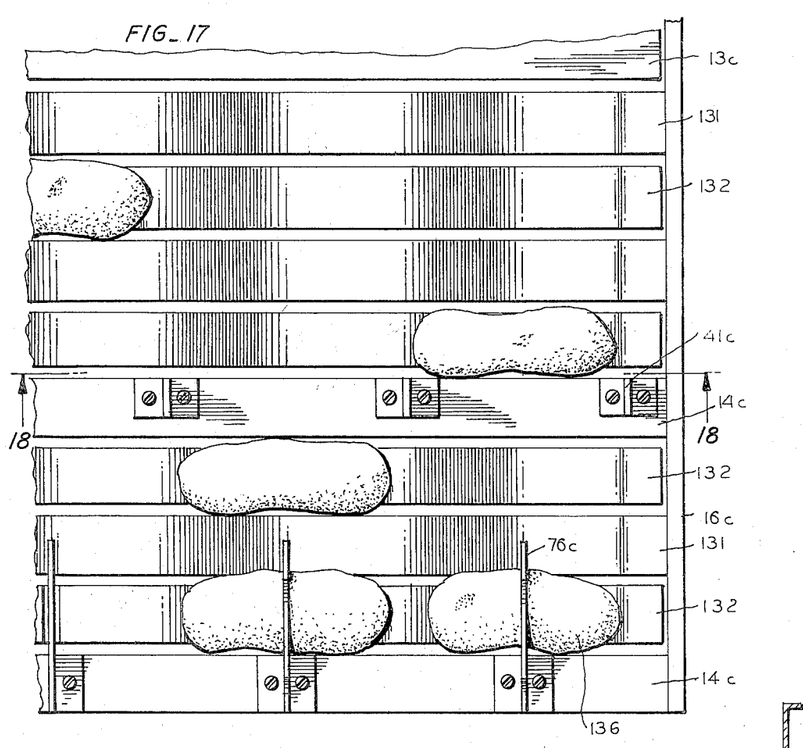
FIG. 17 is a fragmentary plan view of the shuffle feed apparatus.
Figures 18, 19:
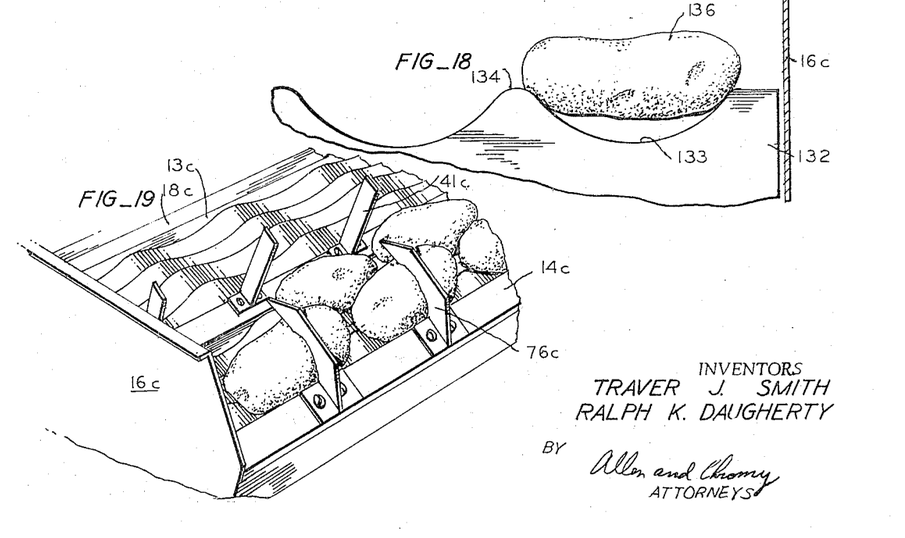
FIG. 18 is a fragmentary sectional view taken as indicated by the plane of the line 18—18 in FIG. 17.
FIG. 19 is a fragmentary perspective view of the apparatus illustrating the cutting or halving operation.

Referring to the modification in FIGS. 17, 18 and 19 an arrangement is shown whereby vegetable articles, for example, may be cut in two in order to provide a smaller article to handle for various processing purposes. For example, in the processing of potatoes to produce potato chips, the high volume of sale of potato chips in small bags, for example to school children, causes a shortage in small potatoes as the average size in the crop does not provide enough small potatoes for the small potato chips. By cutting the potatoes in half the halves can be used in the same manner as small potatoes in producing chips, and therefore the producer can proportion the size of potatoes to his sales requirements.

The shuffle feed mechanism is generally similar to that shown in the preceding modifications and insofar as parts are similar the same numbers have been used with a suffix "c."

Referring to FIGS. 17 and 18, there are shown a series of shuffle feed members 13c which alternate with shuffle feed members 14c thereafter a plurality of sets of shuffle members 131 and 132 which move in opposite directions, the shuffle members 131 being associated with the shuffle members 14c and the side frame 16c and the shuffle members 132 being associated with the shuffle members 13c in their reciprocation. Each of the shuffle members 131 and 132 including means providing a defined path tending to align a series of articles in a row in the direction of travel and for this purpose the shuffle members 131 and 132 are scalloped to provide recessed portions or paths 133 which are separated by high points 134 to form the scallops. If desired the beginning one of these shuffle members 131 and 132 may have a shallower scallop than a subsequent one. Because of the rounded ends of the potatoes 136 for example they will tend to center themselves in the scalloped area or path.

Following the first two sets of shuffle members 132 and 131 there is provided a shuffle member 14c having projections 41c thereon defining lanes or paths for travel of the articles therebetween. If an article is not exactly in its lane, or if one end is ahead of the other, it will encounter one of these projections 41c and be turned in the right direction to be centered in the correct path. Following the plain shuffle 14c there is again an alternating series of shuffles 132 and 131 having a scalloped configuration to progress the articles along in defined paths, and the last shuffle 132 carries the article, for example the potato as shown, past the halving knife 76c in the same fashion as described in connection with the preceding embodiments.

While we have shown and described certain preferred embodiments of the invention, it will be apparent that the invention is capable of variation and modification from the form shown so that the scope should be limited only by the proper interpretation of the scope of the claims appended hereto.

We claim:

1. In a cutting mechanism for vegetable articles, a first member having a generally planar article supporting surface, a knife mounted adjacent one edge of said planar surface in position to sever an article advanced across said surface, a second member mounted for relative reciprocating movement with respect to said first member and having a planar article supporting surface and an article advancing surface, said advancing surface being effective to advance an article across said planar article supporting surface of said first member to effect severing of the article, and means for reciprocating said second member with respect to said first member to cause movement of said article advancing surface toward and away from said knife, a stop carried by one of said members for an article on a supporting surface, and means for advancing an article transversely of the direction of travel toward said knife and into engagement with said stop before engagement of said article with said knife.

2. In a cutting mechanism for vegetable articles, a first member having a generally planar article supporting surface, a knife mounted adjacent one edge of said planar surface in position to sever an article advanced across said surface, a second member mounted for relative reciprocating movement with respect to said first member and having a planar article supporting surface and an article advancing surface, said advancing surface being effective to advance an article across said planar article supporting surface of said first member to effect severing of the article, and means for reciprocating said second member with respect to said first member to cause movement of said article advancing surface toward and away from said knife.

3. In a cutting mechanism for vegetable articles, a pair of parallel members disposed in offset position, at least one of said members having an article supporting surface, a knife mounted adjacent one edge of said one member, a third member mounted between said pair of members and for relative movement with respect thereto and having an article advancing surface, means for effecting relative reciprocation between said third member and said pair of members to cause movement of said article advancing surface toward and away from said knife, a stop carried by said one member, and means for advancing an article transversely of the direction of travel toward said knife and into engagement with said stop before engagement of said article with said knife.

4. In a shuffle feed mechanism having respective sets of shuffle members mounted for reciprocation with respect to each other to advance an article step by step and from valley to valley of said shuffle feed mechanism, means defining a path lengthwise of said shuffle feed members and extending transversely thereof for a distance longer than the article to be processed, means for advancing an article toward one side of said path defining means to position the end of the article against said one side, and a knife positioned in said shuffle feed mechanism to cut off an end of an article positioned against said one side.

5. In a shuffle feed mechanism having respective sets of shuffle members mounted for reciprocation with respect to each other to advance an article step by step and from valley to valley of said shuffle feed mechanism, means defining a path lengthwise of said shuffle feed members and extending transversely thereof for a distance longer than the article to be processed, means for advancing an article toward one side of said path defining means to position the end of the article against said one side, and a pair of knives positioned in said shuffle feed mechanism to cut off the ends of an article positioned against said one side.

6. In a shuffle feed mechanism having respective sets of shuffle members mounted for reciprocation with respect to each other to advance an article step by step and from valley to valley of said shuffle feed mechanism, means defining a path lengthwise of said shuffle feed members and extending tranversely thereof for a distance longer than the article to be processed, means for advancing an article toward one side of said path defining means to position the end of the article against said one side, and a knife positioned in said shuffle feed mechanism to cut off an end of an article positioned against said one side and means including a pair of conveyors at the discharge end of said shuffle feed mechanism to receive said article ends and said articles.

7. In a shuffle feed mechanism having a first set of shuffle members extending transversely to the length of the machine, and a second set of similarly disposed shuffle members arranged in alternating parallel relation with said first set to provide transverse valleys, means for effecting reciprocation of at least one set of said members to advance an article from valley to valley of the feed mechanism, an article positioning member carried by one of said shuffle members for movement in a direction extending lengthwise of the shuffle member and transverse to the direction of movement of said shuffle member, said positioning member being spring-urged to an inactive position, means responsive to actuation of said shuffle members for operating said positioning member to move lengthwise of said shuffle members, and a stop opposed to said positioning member.

8. In a shuffle feed mechanism having a first set of shuffle members extending transversely to the length of the machine, and a second set of similarly disposed shuffle members arranged in alternating parallel relation with said first set to provide transverse valleys, means for effecting reciprocation of at least one set of said members to advance an article from valley to valley of the feed mechanism, an article positioning member carried by one of said shuffle members for movement in a direction extending lengthwise of the shuffle member and transverse to the direction of movement of said shuffle member, said positioning member being spring-urged to an inactive position, and linkage means comprising respective parts on said respective sets and responsive to actuation of said shuffle members for operating said positioning member to move lengthwise of said shuffle members, and a stop opposed to said positioning member.

9. A shuffle feed mechanism comprising respective sets of shuffle members extending in parallel alternating relation to each other to provide valleys, means for effecting relative reciprocation of said sets of shuffle members to cause progression of an article from valley to valley of said shuffle feed mechanism, a shaft extending parallel to and mounted for endwise movement in one of said shuffle members, spring means urging said shaft in one direction, a plurality of rows of partition members on said shuffle feed members dividing said shuffle feed mechanism into a plurality of parallel paths, a positioning element along said shaft for each of said paths, a spring connection for mounting each positioning element on said shaft to effect a yieldable advance of said element toward one of said partition members, and means operable as an incident to reciprocating movement of said shuffle feed members for moving said shaft transversely of said shuffle feed members to correspondingly move said individual positioning elements.

10. In a shuffle feed mechanism having respective sets of shuffle members mounted for reciprocation with respect to each other to advance an article step by step and from valley to valley of said shuffle feed mechanism, means defining a path lengthwise of said shuffle feed members and extending transversely thereof for a distance longer than the article to be processed, means for advancing an article toward one side of said path defining means to position the end of the article against said one side, a knife positioned in said shuffle feed mechanism to cut off an end of an article positioned against said one side, means for thereafter advancing the article toward the opposite side of said path defining means, and a second knife for severing the end of an article positioned against said opposite side whereby an article has a fixed amount of its length severed from each end thereof.

11. In a shuffle feed apparatus, a first shuffle feed mechanism, a second shuffle feed mechanism with its feed end disposed to receive articles from the discharge end of said first shuffle feed mechanism, means providing partitions separating said second shuffle feed mechanism into parallel paths of movement, and means parallel with said separating means and extending upwardly adjacent the discharge end of said first shuffle feed mechanism and forming a pivot element whereby an article discharged from the first shuffle feed mechanism and striking said pivot element will fall into either of two of the adjacent paths of said second shuffle feed mechanism.

12. In a processing mechanism for vegetable articles, a first member having an article supporting surface, a second member mounted for relative reciprocatory movement with respect to said first member and having an article advancing surface, an article treating station, means for reciprocating said second member with respect to said first member to move said article advancing surface toward and away from said article treating station, a stop carried by said first member for an article on its supporting surface, and means for advancing an article transverse to the direction of travel towards said station and into engagement with said stop before movement of said article to said station.

13. In an article processing mechanism as recited in claim 12 in which said article advancing means comprises a linkage connection between said members including toggle means connected between one of said members and said transverse advancing means, and a link pivotally connected to a pivot point of said toggle means and connected to the other of said members.

14. In an article processing mechanism as recited in claim 12 in which said article advancing means comprises a support and an article advancing member movably mounted on said support, and yieldable means is interposed between said operating means and said member to provide over travel of the operating means in either direction of movement with respect to said member.

15. In a shuffle feed mechanism as recited in claim 4, in which said article advancing means includes a supporting member and an article advancing member movably mounted thereon, and yieldable means positioning said article advancing member with respect to said supporting member and disposed to permit over travel of said article supporting member with respect to said advancing member in at least one direction of movement.

16. A shuffle feed mechanism, comprising respective sets of shuffle members extending in parallel alternating relation to each other to provide valleys extending transversely across said shuffle feed mechanism, means for effecting relative reciprocation of said sets of shuffle members to cause progression of an article from valley to valley of said shuffle feed mechanism, means providing a plurality of rows of articles for lengthwise progression of said articles along separated lengthwise paths in said shuffle feed mechanism, including means individual to each path for effecting centering of an article in said path, to place each article in selected position with respect thereto, and knife means associated with each of said paths for severing an article at said predetermined positions.

17. A shuffle feed mechanism as recited in claim 16 in which said centering effecting means comprises a scalloped construction of shuffle feed members.

18. A shuffle feed mechanism, comprising respective sets of shuffle members extending in parallel alternating relation to each other to provide valleys extending transversely across said shuffle feed mechanism, means for effecting relative reciprocation of said sets of shuffle members to cause progression of an article from valley to valley of said shuffle feed mechanism, means providing a row of articles for length-wise progression of said articles along a path in said shuffle feed mechanism, including means for effecting centering of an article in said path, to place each article of the row in an approximate predetermined selected position with respect thereto, and knife means associated with said path for severing an article at said predetermined position.

19. A shuffle feed mechanism as recited in claim 16 in which said centering effecting means comprises a plurality of sets of said shuffle feed members each having a series of recesses formed in their respective article advancing surfaces forming said paths, at least one shuffle member following said first set of shuffle members having projection defining said plurality of paths, and a second set of shuffle members receiving articles from said one shuffle member and also each having a series of recesses spaced transversely thereacross, each recess corresponding to one of said paths.

20. A shuffle feed mechanism as recited in claim 16 in which said centering effecting means comprises a transverse series of concave arcuate recesses formed in certain of said shuffle members.

References Cited by the Examiner
UNITED STATES PATENTS

| | | | |
|---|---|---|---|
| 1,283,541 | 11/1918 | Morral et al. | 146—84 |
| 1,671,038 | 5/1928 | McKain | 146—86 |
| 2,463,578 | 3/1949 | Tyler | 198—219 X |
| 2,728,443 | 12/1955 | Pike et al. | 198—219 X |

ROBERT C. RIORDON, *Primary Examiner.*

W. G. ABERCROMBIE, *Assistant Examiner.*